(12) United States Patent
Cohen

(10) Patent No.: US 10,621,667 B2
(45) Date of Patent: *Apr. 14, 2020

(54) METHOD AND SYSTEM FOR DISPLAYING AND TRADING SPREADS

(71) Applicant: Trading Technologies International, Inc., Chicago, IL (US)

(72) Inventor: Joel Cohen, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,325

(22) Filed: Sep. 12, 2018

(65) Prior Publication Data

US 2019/0019253 A1    Jan. 17, 2019

Related U.S. Application Data

(63) Continuation of application No. 15/014,681, filed on Feb. 3, 2016, now Pat. No. 10,102,580, which is a continuation of application No. 14/134,009, filed on Dec. 19, 2013, now Pat. No. 9,286,638, which is a continuation of application No. 13/867,116, filed on Apr. 21, 2013, now Pat. No. 8,639,613, which is a continuation of application No. 13/348,401, filed on Jan. 11, 2012, now Pat. No. 8,447,685, which is a continuation of application No. 12/431,282, filed on Apr. 28, 2009, now Pat. No. 8,131,629, which is a continuation of application No. 11/417,912, filed on May 3, 2006, now Pat. No. 7,542,941, and a continuation of application No. 10/229,986, filed on Aug. 28, 2002, now Pat. No. 7,542,937.

(51) Int. Cl.
*G06Q 40/04* (2012.01)
*G06Q 40/00* (2012.01)

(52) U.S. Cl.
CPC ............ *G06Q 40/04* (2013.01); *G06Q 40/00* (2013.01)

(58) Field of Classification Search
CPC .............................. G06Q 40/04; G06Q 40/00
See application file for complete search history.

(56) References Cited

U.S. PATENT DOCUMENTS

| | | | |
|---|---|---|---|
| 5,297,032 A | 3/1994 | Trojan et al. | |
| 6,772,132 B1 | 8/2004 | Kemp, II et al. | |
| 6,938,011 B1 | 8/2005 | Kemp, II et al. | |
| 7,130,823 B1 * | 10/2006 | Rayner | G06Q 40/00 705/37 |
| 7,133,847 B2 * | 11/2006 | Himmelstein | G06Q 20/382 705/80 |

(Continued)

FOREIGN PATENT DOCUMENTS

| | | |
|---|---|---|
| WO | 02/15461 A2 | 2/2002 |
| WO | 02/79940 A2 | 10/2002 |

*Primary Examiner* — Muriel S Tinkler
(74) *Attorney, Agent, or Firm* — McDonnell Boehnen Hulbert & Berghoff LLP

(57) ABSTRACT

A trading application can receive price and quantity information for tradable objects. The trading application can compute implied price and quantity information for spreads of the tradable objects. Direct and indirect price and quantity information for the spreads can be displayed in a manner that shows the relationship with each other and with the price and quantity information for the tradable objects.

19 Claims, 11 Drawing Sheets

(56) References Cited

U.S. PATENT DOCUMENTS

| | | | |
|---|---|---|---|
| 7,243,083 B2 * | 7/2007 | Burns | G06Q 40/00 |
| | | | 705/37 |
| 7,251,629 B1 * | 7/2007 | Marynowski | G06Q 40/04 |
| | | | 705/37 |
| 7,389,268 B1 | 6/2008 | Kemp, II et al. | |
| 7,542,937 B1 | 6/2009 | Cohen | |
| 7,542,941 B1 | 6/2009 | Cohen | |
| 8,131,629 B1 | 3/2012 | Cohen | |
| 8,447,685 B2 | 5/2013 | Cohen | |
| 8,639,613 B2 | 1/2014 | Cohen | |
| 9,286,638 B2 | 3/2016 | Cohen | |
| 2002/0023038 A1 | 2/2002 | Fritsch et al. | |
| 2002/0035534 A1 | 3/2002 | Buist et al. | |
| 2002/0055899 A1 * | 5/2002 | Williams | G06Q 30/08 |
| | | | 705/37 |
| 2002/0073017 A1 | 6/2002 | Robertson | |
| 2002/0120551 A1 | 8/2002 | Jones | |
| 2002/0138401 A1 | 9/2002 | Allen et al. | |
| 2002/0194115 A1 * | 12/2002 | Nordlicht | G06Q 40/04 |
| | | | 705/37 |
| 2003/0004852 A1 * | 1/2003 | Burns | G06Q 40/00 |
| | | | 705/37 |
| 2003/0004853 A1 | 1/2003 | Ram et al. | |
| 2003/0009411 A1 * | 1/2003 | Ram | G06F 17/246 |
| | | | 705/37 |
| 2012/0116945 A1 | 5/2012 | Cohen | |
| 2013/0304624 A1 | 11/2013 | Cohen | |
| 2014/0337193 A1 | 11/2014 | Cohen | |
| 2016/0155199 A1 | 6/2016 | Cohen | |

* cited by examiner

LIFFE:cC 1

| Contract | Outright Ask Prc | Outright Ask Qty | Calendar Ask Prc | Calendar Ask Qty | Butterfly Ask Prc | Butterfly Ask Qty | Condor Ask Prc | Condor Ask Qty |
|---|---|---|---|---|---|---|---|---|
| | Bid Prc | Bid Qty | Bid Prc | Bid Qty | Bid Prc | Bid Qty | Bid Prc | Bid Qty |
| Sep 02 | 5 | 1 | | | | | | |
| | 1 | 1 | 4 | 1 | | | | |
| Dec. 02 | 3 | 2 | -2 | 1 | 5 | 1 | | |
| | 1 | 2 | 2 | 2 | -4 | 1 | 5 | 1 |
| Mar 03 | 2 | 3 | -1 | 2 | 4 | 1 | -2 | 1 |
| | 1 | 2 | -1 | 1 | -1 | 1 | 2 | 2 |
| May 03 | 3 | 2 | -2 | 2 | 0 | 2 | -3 | 2 |
| | 2 | 9 | 2 | 2 | -4 | 1 | 4 | 2 |
| Jul 03 | 2 | 2 | 0 | 2 | 6 | 1 | -1 | 2 |
| | 1 | 2 | -1 | 2 | 1 | 1 | 9 | 2 |
| Sep 03 | 5 | 2 | -4 | 2 | 5 | 1 | 0 | 2 |
| | 3 | 2 | 0 | 2 | -4 | 1 | 2 | 2 |
| Dec 03 | 10 | 2 | -6 | 2 | 3 | 1 | -10 | 2 |
| | 5 | 2 | 6 | 2 | -13 | 1 | 5 | 2 |
| Mar 04 | 8 | 2 | -2 | 2 | 11 | 1 | -9 | 2 |
| | 4 | 2 | 2 | 2 | -5 | 1 | 7 | 2 |
| May 04 | 9 | 2 | -5 | 2 | 3 | 1 | -7 | 1 |
| | 6 | 2 | 5 | 2 | -10 | 1 | | |
| Jul 04 | 7 | 2 | -1 | 2 | | | | |
| | 4 | 2 | | | | | | |

Spread/Matrix | Butterfly 100　102　104　106　108　110　112　114　116

FIG. 2B

| Contract | Outright | | | |
| | Ask Prc | Calendar | | |
| | Bid Prc | Ask Prc | Butterfly | |
| | | Bid Prc | Ask Prc | Condor |
| | | | Bid Prc | Ask Prc |
| Sep 02 | 5 | | | Bid Prc |
| | 1 | 4 | | |
| Dec. 02 | 3 | -2 | 5 | |
| | 1 | 2 | -4 | 5 |
| Mar 03 | 2 | -1 | 4 | -2 |
| | 1 | -1 | -1 | 2 |
| May 03 | 3 | -2 | 0 | -3 |
| | 2 | 2 | -4 | 4 |
| Jul 03 | 2 | 0 | 6 | -1 |
| | 1 | -1 | 1 | 9 |
| Sep 03 | 5 | -4 | 5 | 0 |
| | 3 | 0 | -4 | 2 |
| Dec 03 | 10 | -6 | 3 | -10 |
| | 5 | 6 | -13 | 5 |
| Mar 04 | 8 | -2 | 11 | -9 |
| | 4 | 2 | -5 | 7 |
| May 04 | 9 | -5 | 3 | -7 |
| | 6 | 5 | -10 | |
| Jul 04 | 7 | -1 | | |
| | 4 | | | |

Spread/Matrix  Butterfly
100  102  106  110  114

FIG. 2C

| Contract | Outright | | Calendar | | Butterfly | | Condor | |
|---|---|---|---|---|---|---|---|---|
| | Ask Prc | Bid Prc | | | | | | |
| | Ask Qty | Bid Qty | Ask Prc | Bid Prc | | | | |
| | | | Ask Qty | Bid Qty | Ask Prc | Bid Prc | | |
| | | | | | Ask Qty | Bid Qty | Ask Prc | Bid Prc |
| | | | | | | | Ask Qty | Bid Qty |
| Sep 02 | 5 | 1 | 4 | -2 | | | | |
| | 1 | 1 | | | | | | |
| Dec. 02 | 3 | 2 | 1 | 1 | 5 | -4 | | |
| | 2 | 1 | 2 | -1 | 1 | 1 | 5 | -2 |
| Mar 03 | 2 | 1 | 2 | 2 | 4 | -1 | 1 | 1 |
| | 3 | 2 | -1 | -2 | 1 | 1 | 2 | -3 |
| May 03 | 3 | 2 | 1 | 2 | 0 | -4 | 2 | 2 |
| | 2 | 9 | 2 | 0 | 2 | 1 | 4 | -1 |
| Jul 03 | 2 | 1 | 2 | 2 | 6 | 1 | 2 | 2 |
| | 2 | 2 | -1 | -4 | 1 | 1 | 9 | 0 |
| Sep 03 | 5 | 3 | 2 | 2 | 5 | -4 | 2 | 2 |
| | 2 | 2 | 0 | -6 | 1 | 1 | 2 | -10 |
| Dec 03 | 10 | 5 | 2 | 2 | 3 | -13 | 2 | 2 |
| | 2 | 2 | 6 | -2 | 1 | 1 | 5 | -9 |
| Mar 04 | 8 | 4 | 2 | 2 | 11 | -5 | 2 | 2 |
| | 2 | 2 | 2 | -5 | 1 | 1 | 7 | -7 |
| May 04 | 9 | 6 | 2 | 2 | 3 | -10 | 2 | 1 |
| | 2 | 2 | 5 | -1 | 1 | 1 | | |
| Jul 04 | 7 | 4 | 2 | 2 | | | | |
| | 2 | 2 | | | | | | |

Spread/Matrix | Butterfly

FIG. 2E

METHOD AND SYSTEM FOR DISPLAYING AND TRADING SPREADS

CROSS REFERENCE TO RELATED APPLICATIONS

This application is a continuation of U.S. patent application Ser. No. 15/014,681, filed Feb. 3, 2016, now U.S. Pat. No. 10,102,580, which is a continuation of U.S. patent application Ser. No. 14/134,009, filed Dec. 19, 2013, now U.S. Pat. No. 9,286,638, which is a continuation of U.S. patent application Ser. No. 13/867,116, filed Apr. 21, 2013, now U.S. Pat. No. 8,639,613, which is a continuation of U.S. patent application Ser. No. 13/348,401, filed Jan. 11, 2012, now U.S. Pat. No. 8,447,685, which is a continuation of U.S. patent application Ser. No. 12/431,282, filed Apr. 28, 2009, now U.S. Pat. No. 8,131,629, which is a continuation of U.S. patent application Ser. No. 11/417,912, filed May 3, 2006, now U.S. Pat. No. 7,542,941, which is a continuation of U.S. patent application Ser. No. 10/229,986, filed Aug. 28, 2002, now U.S. Pat. No. 7,542,937, entitled "Method and System for Displaying and Trading Spreads," the contents of each of which are fully incorporated herein by reference for all purposes.

FIELD OF THE INVENTION

The present invention relates generally to the electronic trading. More specifically, it relates to a method for processing trading information.

BACKGROUND OF THE INVENTION

Many exchanges throughout the world now support electronic trading. Electronic trading has made it possible for an increasing number of people to actively participate in a market at any given time. The increase in the number of potential market participants has advantageously led to, among other things, a more competitive market and greater liquidity.

Exchanges that support electronic trading are generally based on a host, one or more computer networks, and clients. In general, the host includes one or more centralized computers to form the electronic heart. Its operations typically include order matching, maintaining order books and positions, price information, and managing and updating a database that records such information. The host is also equipped with an external interface that maintains uninterrupted contact to the clients and possibly other trading-related systems.

Typically, market participants link to the host through one or more networks. A network is a group of two or more computers linked together. There are many types of networks such as local area networks and wide area networks. Networks can also be characterized by topology, protocol, and architecture. However, any type of network configuration can be used in electronic trading. For example, some market participants may link to the host through a direct connection such as a T1 line or an Integrated Digital Services Network ("ISDN") connection. Some participants may link to the exchange through direct connections, which can use common network components such as high-speed servers, routers, and gateways, and so on.

Regardless of the way in which a connection is established, software running on the clients allows people to log onto one or more exchanges and participate in one or more markets. Some clients run software that creates specialized interactive trading screens. In general, the trading screens enable people to enter orders into the market, obtain market quotes, and monitor positions. The range and quality of features available varies according to the specific software.

The trading screens enable the traders to enter and execute orders, obtain market quotes, and monitor positions while implementing various trading strategies including those previously used on the floor of an exchange. Such strategies incorporated into an electronic marketplace can improve the speed, accuracy, and ultimately the profitability of trading electronically. One such trading strategy is spread trading.

Spread trading is the buying and/or selling of two or more tradable objects, the purpose of which is to capitalize on changes or movements in the relationships between the tradable objects. A spread trade could involve buying two or more tradable objects, buying and selling two or more tradable objects, selling two or more tradable objects or some combination thereof. Often, the tradable objects being spread are contracts for different delivery months (e.g., expiration dates) of the same tradable object or contracts of the same tradable object at different strike prices, but sometimes involve different tradable objects or the same tradable object on different exchanges.

Spread trading is usually less risky than other types of trading strategies such as position trades. In spread trading, a position is protected by taking an offsetting position in a related product, thereby potentially reducing the risk of adverse price movements. For example, a trader might simultaneously buy and sell two options of the same class at different strike prices and/or expiration dates. Of course, there are many other reasons for spread trading, and there are many known varieties of spread trading techniques.

With the advent of electronic trading, trading strategies such as spread trading can be incorporated into the electronic marketplace. However, the success of a trader who trades in a competitive electronic trading environment may depend on many factors. Among those factors include speed, such as the speed in calculating what tradable objects to quote, the speed in calculating what price to quote at, and the speed in calculating how much to quote. Because speed is of great importance, it is desirable for electronic trading systems to offer tools that can assist a trader in trading in an electronic marketplace, and help the trader to make trades at the most favorable prices in a speedy and accurate manner.

In the following detailed description, a trading application and trading interface for electronic spread trading are described. These tools provide advantages, as described below, to a trader in an electronic trading environment.

BRIEF DESCRIPTION OF THE DRAWINGS

The presently preferred embodiments of the present invention are described herein with reference to the drawings, in which:

FIG. 2B is a screenshot of the trading screen of FIG. 2A displaying multiple condor spreads;

FIG. 2C is a screenshot of an alternate format for displaying spreads in a trading screen that displays only pricing information;

FIG. 2E is a screenshot of an alternate format for displaying spreads in a trading screen that display ask information and bid information in adjacent columns;

DETAILED DESCRIPTION OF THE PRESENTLY PREFERRED EMBODIMENTS

I. General Overview of Spreads

Figure 1:
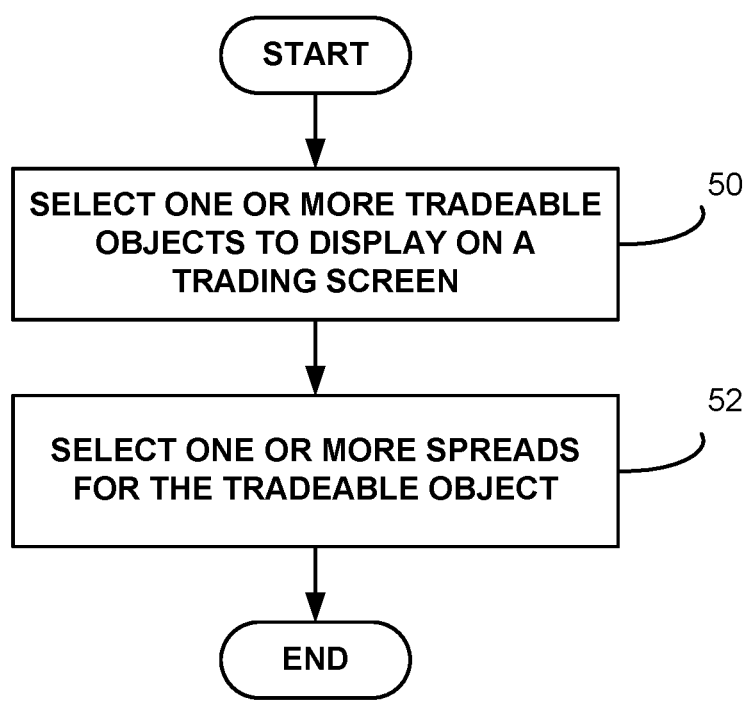
FIG. 1 is a flowchart of a preferred process used to configure a trading screen.

Generally, a "spread" is the purchase or sale of one or more tradable objects and an associated purchase or sale of one or more tradable objects. A tradable object can be any object, such as stocks, options, bonds, futures, currency, warrants, funds, or other financial objects. Other objects, for example, grains, energy and metals can also be traded. Of course, these list are not exhaustive, and any other object for which there exists a market can be traded. Tradeable objects can be "real," such as products that are listed by an exchange for trading, or they can by "synthetic," such as a combination of real products that is created by a trader.

A tradable object is generally associated with a time period. The time period can correspond to a future expiration date for the tradable object. The tradable object could be, for example, a contract to buy or sell a specific quantity of the tradable object at a time in the future. For instance, a tradable object could be a February corn contract, which would be a contract to buy or sell a specified quantity of corn at a date in February. Within any month, the expiration date of the contract is typically set by the market, but the particular contract may alternatively specify any date.

The time periods for the tradable object can be any of a variety of different time periods, such as days, weeks, months, years or other time periods, and the preferred embodiments are not limited to trading objects maturing over any particular time period. Of course, a tradable object can also be associated with a strike price instead of a time period.

In spread trading, the tradable objects generally, but not always, have a corresponding price relation. According to the relation, an increase in the price of a first tradable object will generally be offset by a decrease in the price of a second tradable object. Similarly, a decrease in the price of the first tradable object will generally coincide with an increase in the price of the second object. While this inverse price relationship can limit the upside of a spread, it can also limit the downside of a spread because prices of related objects tend to move in the same direction. Thus, a spread can reduce the downside risk for a trader.

While a spread can involve two tradable object "legs," it may alternatively include more than two legs. Two popular types of multi-leg spreads are butterflies and condors. A butterfly generally refers to a three-leg option spread, and a condor generally refers to a four-leg option spread. It should be understood, however, that the principles discussed with respect to butterflies and condors are not limited to options trading but may be extended to any tradable object. Additionally, they are not confined to butterflies and condors, but may be extended to any multi-leg spread.

Buying a butterfly includes buying one front month, selling two middle months and buying one far month. Selling a butterfly includes selling one front month, buying two middle months and selling one far month. In the butterfly, the two middle months are the same, so the butterfly is a three-leg spread. As one example, a butterfly can include buying one January corn contract, selling two February corn contracts, and buying one March corn contract. Of course, a butterfly is not limited to corn contracts but rather may involve any tradable object. Additionally, other time periods or strike prices can be used. It is also not necessary that the three time periods, such as months, be consecutive. For example, buying a butterfly might include buying a January contract, selling two September contracts, and buying one January contract of the following year.

Buying a condor is commonly executed as buying one front month, selling two middle months and buying one far month. Selling a condor is executed as selling one front month, buying two middle months and selling one far month. In contrast to the butterfly, the two middle months in the condor are not the same. Thus, the condor is a four-leg spread. Buying a condor could be, for example, buying one January corn contract, selling one February corn contract, selling one March corn contract, and buying one April corn contract. As with the butterfly, other tradable objects and time periods (or strike prices) can be used, and it is not necessary that the time periods be consecutive.

While butterflies and condors can each be formed from outright tradable objects, they can alternatively be formed from a combination of two different two-leg spreads. As previously described, the butterfly is commonly implemented as buying or selling a front month, selling or buying two middle months and buying or selling a far month. Using two-leg spreads, the butterfly is a combination of a first spread and a second spread. The first spread has the front and middle months as its legs, and the second spread has the middle and far months as its legs. Then, buying a butterfly includes the combination of buying the first spread (i.e., buying the front month and selling the middle month) and selling the second spread (i.e., selling the middle month and buying the far month). Selling a butterfly includes the combination of selling the first spread and buying the second spread.

Similarly, the condor can be formed from a combination of a first spread and a second spread, which are both two-leg spreads. The condor is implemented as buying or selling a front month, selling or buying two different middle months, and buying or selling a far month. Thus, the first spread uses the front month and a first middle month as its legs, and the second spread uses a different middle month and a far month as its legs. Then, buying a condor includes the combination of buying the first spread (i.e., buying the front month and selling a first middle month) and selling the second spread (i.e., selling a second middle month and buying the far month). Selling a condor includes selling the first spread and buying the second spread.

II. Displaying Spread Information

A trader can use electronic trading software to interface with one or more exchanges. The trading software can interface with an exchange through a variety of different links, such as over the Internet or through a direct connection with the exchange. Once connected to the exchange, the trading software can receive a stream of information from the exchange. A method and system for using trading software to interface with an exchange is described in U.S. patent application Ser. No. 09/590,692, filed Jun. 9, 2000, entitled "Click Based Trading with Intuitive Grid Display of Market," and is also described in U.S. patent application Ser. No. 09/589,751, filed Jun. 9, 2000, entitled "Click Based Trading with Market Depth Display." Both applications are commonly assigned to Trading Technologies International, Inc., and the contents of both applications are incorporated herein by reference. Moreover, the trading application may implement tools for trading tradable objects that are described in a U.S. patent application Ser. No. 10/125,894 filed on Apr. 19, 2002, entitled "Trading Tools for Electronic Trading," the contents of which are incorporated herein by reference.

For example, the trading software can receive a list of tradable objects traded on the exchange. Additionally, the trading software can receive market information for each tradable object, such as bid prices, bid quantities, ask prices, ask quantities, and additionally, some exchanges provides amounts and quantities of past sales, and other market related information. The information can be continually provided to the trading software, which can allow the trading software to continually update its trading screen with current market information.

Once the trading software receives this information from the exchange, the trading software can format and display the information. In addition to displaying the outright trading information for a tradable object, the trading software can compute and display various spreads. The output configuration of the trading software can, of course, be predetermined. However, a user of the trading software can specify configuration information, and this can be used to reconfigure the trading screen.

FIG. 1 is a flowchart of a preferred process used to configure a trading window, such as one that can be used to display multi-leg spreads. At Step 50, a user selects one or more tradable objects to display on the trading screen. The user can select any of the available tradable objects traded on the exchange. As previously described, a tradable object selected by the user can have associated with it a time period or a strike price. The time periods or strike prices can be used in computing and displaying spreads from the selected tradable object. Various different time periods, such as days, weeks, months, years or others, can be used. Strike prices such as tradable objects with the lowest strike price, next highest strike price, the highest strike price, and so on may be used.

Then, at Step 52, the user can select one or more spreads to be displayed for the tradable objects. Optionally, the trading software may be configured to automatically compute one or more spreads for the selected tradable objects without the user making a selection. For example, the trading software may automatically compute two-leg, butterfly and condor spreads for the user's tradable object selection. Of course, if the user only selected two or three tradable objects, then the software may then only compute the two-leg or butterfly spreads. Also, if the exchange doesn't already support direct trading of one or more of the spreads, the trading software may automatically establish that spread on the exchange. This can be done with an exchange, such as LIFFE, which allows a trader to establish and then trade a new spread on the exchange. Alternatively, the trader may manually select one or more of the spreads to be established on the exchange. This may be done, for example, by "clicking" or otherwise selecting one of the spreads that is not currently directly traded on the exchange.

Figure 2A:
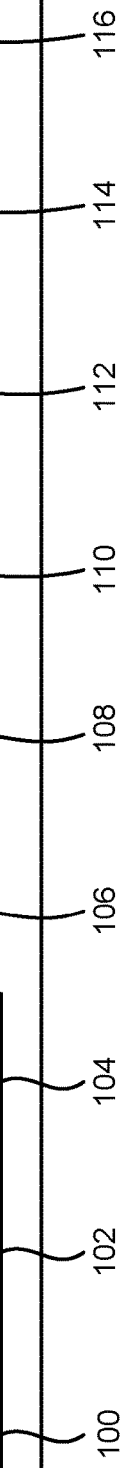
FIG. 2A is a screenshot of a preferred format for displaying spreads in a trading screen.

FIG. 2A is a screenshot of a preferred format for displaying spreads and market-related information in a trading screen. The trading screen provides a unique way in displaying the different types of spreads (e.g., calendar, butterfly, and condor) and outright legs so that a trader can quickly identify the relationship between the various spreads and outright legs.

The trading screen as depicted in FIG. 2 uses five columns, however, alternate embodiments can use a greater or fewer number of columns. The first column is a Contract column 100. This column represents the selected tradable object by displaying an identifier for the tradable object. As shown in FIG. 2, the Contract column 100 displays the time periods for the tradable objects. Alternatively, it could display strike prices or other identifiers for the tradable objects. In FIG. 2, the Contract column 100 displays identifiers for four contracts; however, a may display identifiers for a fewer or greater number of tradable objects, and it can display identifiers for tradable objects other than contracts. As shown in FIG. 2, the Contract column 100 includes March 2001, June 2001, September 2001 and December 2001 expiration dates. Of course, the actual time periods displayed will depend on the user's selections. It should also be understood that more or fewer months may be displayed for the selected contract. For example, instead of displaying only four months as shown in the figure, five months, six months, or more may be displayed in the trading screen. In one alternate embodiment, the identifiers may be color-coded, for example, based on the expiration date of the contract or other tradable object.

The second column is an Outright column. The Outright column displays individual legs for the tradable object. The Outright column includes two sub-columns: an Outright Price column 102 and an Outright Quantity column 104. The Outright Price column 102 holds the bid and ask prices for the tradable object for each month. In one embodiment, the bid and ask prices represent the inside market, that is, the highest bid price with quantity and the lowest ask price with quantity. Similarly, the Outright Quantity column 104 holds the available quantities for the various bid and ask prices.

The third column is a Calendar column, which displays two-leg spread information for the tradable object. The Calendar column further comprises two sub-columns, a Calendar Price column 106 and a Calendar Quantity column 108. The Calendar Price column 106 displays the bid and ask prices for the various spreads, and the Calendar Quantity column 108 displays the available quantities corresponding to the bid and ask prices of the spreads.

As shown in FIG. 2A, the Contract column 100 includes four months. The Calendar column computes three different two-leg spreads for the four months. It includes a March 01/June 01 spread, a June 01/September 01 spread, and a September 01/December 01 spread. The price and quantity information for these spreads is displayed in the Calendar Price column 106 and the Calendar Quantity column 108.

The Calendar column vertically centers the price and quantity information for each spread between the rows for the spread's corresponding months. Thus, the price and quantity information for the March 01/June 01 spread is vertically centered between the March 01 and June 01 rows. Similarly, the price and quantity information for the June 01/September 01 spread is vertically centered between the June 01 and September 01 rows, and the price and quantity information for the September 01/December 01 spread is vertically centered between the September 01 and December 01 rows.

The vertical centering of the Calendar column provides a visual display of the spread information that can be easily correlated to the months that comprise the spread. This display can allow a trader to easily view the outright information for the months and also the spreads corresponding to the months.

In addition to displaying two-leg spreads, the trading screen also displays butterfly spreads. The Butterfly column displays three-leg butterfly spreads for the four months. A Butterfly Price column 110 displays the bid and ask prices for the butterflies, and a Butterfly Quantity column 112 display the available quantities corresponding to the bid and ask prices. As shown in FIG. 2A, the Butterfly column displays three three-leg spreads.

The first butterfly includes the months of March, June and September. Thus, the front month is March 2001, the middle month is June 2001, and the far month is September 2001. The bid and ask price information is displayed for this spread, and the corresponding quantity information is also displayed. The second butterfly includes the months of June, September and December. For the second butterfly, June 2001 is the front month, September 2001 is the middle month, and December 2001 is the far month. As with the first butterfly, the bid and ask prices and their respective quantities are displayed.

The Butterfly columns are vertically centered between the rows that comprise each butterfly. The price and quantity information for the first butterfly is vertically centered between the March 01, June 01 and September 01 rows. Similarly, the price and quantity information for the second butterfly is centered between the June 01, September 01 and December 01 rows. This arrangement allows a trader to view the outright information for the selected months along with the two-leg and butterfly spreads. The spreads can be quickly correlated to their months.

As previously described, the butterfly can be a combination of two different two-leg spreads. In addition to displaying the butterfly in alignment with its individual legs, the format depicted in FIG. 2 also displays the butterfly adjacent to the two-legs spreads that form the butterfly. For example, the first butterfly includes March 2001, June 2001 and September 2001 legs. Thus, it can also be formed from a combination of the March/June and June/September two-leg spreads. As shown in FIG. 2, the March/June/September butterfly is displayed adjacent to the March/June and June/September calendar spreads. This display, in addition to allowing a trader to view market information for individual legs of a butterfly, also allows the trader to view market information for the two-leg spreads that form the butterfly.

The trading screen also displays information for a condor. For the condor, the front month is March 2001, the middle months are June 2001 and September 2001, and the far month is December 2001. Price information for the condor is displayed in a Condor Price column 114, and quantity information for the condor is displayed in a Condor Quantity column 116. The Condor price and quantity columns 114, 116 are vertically centered between the rows that comprise the condor, thereby allowing a trader to easily see the condor information as it relates to the other spreads and outright information.

Similar to the butterfly, the condor can be a combination of two different two-leg spreads. The condor depicted in FIG. 2 has March 2001, June 2001, September 2001 and December 2001 legs. Therefore, it can be made from a combination of March/June and September/December two-leg spreads. The display format depicted in FIG. 2 advantageously allows a trader to view the condor near the two-leg spreads that also form the condor. Thus, the trader can simultaneously view the markets for the condor, for its individual legs, and for the two-leg spreads that form the condor.

FIG. 2B is a screenshot of the trading screen of FIG. 2A displaying multiple condor spreads. As shown in FIG. 2B, the Contract column 100 includes identifiers for ten different contracts. Of course, it could also display identifiers for tradable objects other than contracts. Outright pricing information for the ten contacts is displayed in the Outright Price column 102, and outright quantity information for the ten contracts is displayed in the Outright Quantity column 104. Using the ten contracts, nine different calendar spreads are computed. Pricing information for the calendar spreads is displayed in the Calendar Price column 106, while quantity information for the calendar spreads is displayed in the Calendar Quantity column 108. As with FIG. 2B, the price and quantity information for the calendar spreads is centered with respect to the identifiers for the contacts that comprise the legs of the spreads.

FIG. 2B displays trading information for eight different butterfly spreads. Price information for the butterfly spreads is displayed in a Butterfly Price column 110. Quantity information for the butterfly is displayed in the Butterfly Quantity column 112. The price and quantity information for each butterfly spread is centered with respect to the contracts comprising its legs. Seven different condors are displayed in FIG. 2B. Pricing information for the condors is displayed in the Condor Price column 114, and quantity information for the condors is displayed in the Condor Quantity column 116. The price and quantity information for each condor is centered with respect to the identifiers of its corresponding legs displayed in the Contract column 100.

FIG. 2C is a screenshot of an alternate format for displaying spreads in a trading screen that displays only pricing information. The trading screen depicted in FIG. 2C displays information about various tradable objects; however, instead of displaying both pricing information and quantity information, it displays only pricing information. FIG. 2C includes a Contract column 100, which displays identifiers for various contracts. Of course, it could also display identifiers for other tradable objects.

The Outright Price column 102 displays outright pricing information for the tradable objects identifies by the identifiers displayed in the Contract column 100. The Calendar Price column 106 displays pricing information for various calendar spreads. The Butterfly Price column 110 displays prices for butterfly spreads, and the Condor Price column 114 displays prices for condor spreads. The pricing information for the calendar, butterfly and condor spreads is displayed centered with respect to the identifiers of the legs of the spreads.

Figure 2D:
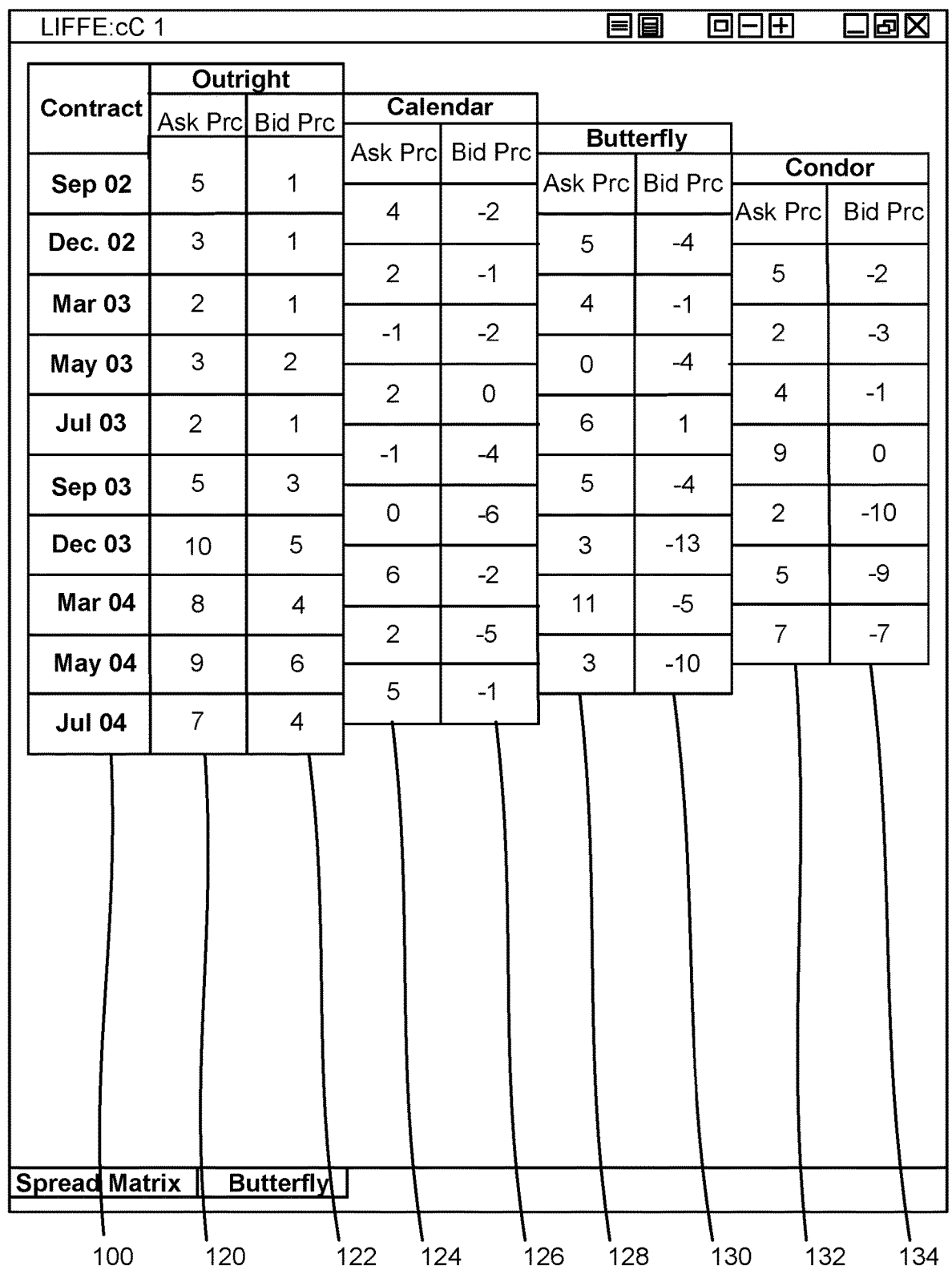
FIG. 2D is a screen shot of an alternate format for displaying spreads a trading screen that displays ask and bid prices in adjacent columns.

FIG. 2D is a screen shot of an alternate format for displaying spreads in a trading screen that displays ask and bid prices in adjacent columns. Similar to FIG. 2C, FIG. 2D displays only pricing information for tradable objects and spreads. However, FIG. 2D displays the bid and ask pricing information in adjacent columns instead of displaying the information in the same column. The Contract column 100 displays identifiers for multiple tradable objects.

An Outright Ask Price column 120 displays outright ask prices for a tradable objects, and an Outright Bid Price column 122 displays outright bid prices for a tradable object. A Calendar Ask Price column 124 displays ask prices for various calendar spreads, while a Calendar Bid Price column 126 displays bid prices for the calendar spreads. A Condor Ask Price column 128 displays ask prices for condor spreads, and a Condor Bid Price column 130 displays bid prices for the condor spreads. The bid and ask prices for the various spreads displayed by the trading screen are centered with respect to the identifiers for the legs of the respective spreads.

FIG. 2E is a screenshot of an alternate format for displaying spreads in a trading screen that displays ask information and bid information in adjacent columns. As shown in FIG. 2E, ask price and ask quantity information for a tradable object or spread is displayed in the same column. Similarly, bid price and bid quantity information for a tradable object or spread is displayed in the same column. This configuration is different than the displays depicted in FIGS. 2A-2B, which displayed the corresponding price and quantity information in adjacent columns.

The Contract column 100 displays identifiers for tradable objects. An Outright Ask column 138 displays outright ask prices and ask quantities for the tradable objects. An Outright Bid Column 140 displays outright bid prices and bid quantities for the tradable objects. A Calendar Ask column 142 displays ask price and ask quantity for various calendar spreads, while a Calendar Bid column 144 displays bid prices and bid quantities for the calendar spreads. The pricing and quantity information is displayed centered with respect to the identifiers for the legs of the spread.

A Butterfly Ask column 146 displays ask price and ask quantity information for butterfly spreads, and a Butterfly Bid column 148 displays bid price and bid quantity information for the butterfly spreads. A Condor Ask column 150 displays ask prices and ask quantities for condor spreads, while a Condor Bid column 152 displays bid prices and bid quantities for the condor spreads. The butterfly and condor pricing and quantity information is displayed centered with respect to the legs of the spread. Other variations to this display are possible, for example, displaying the bid information above the ask information.

Figure 2F:
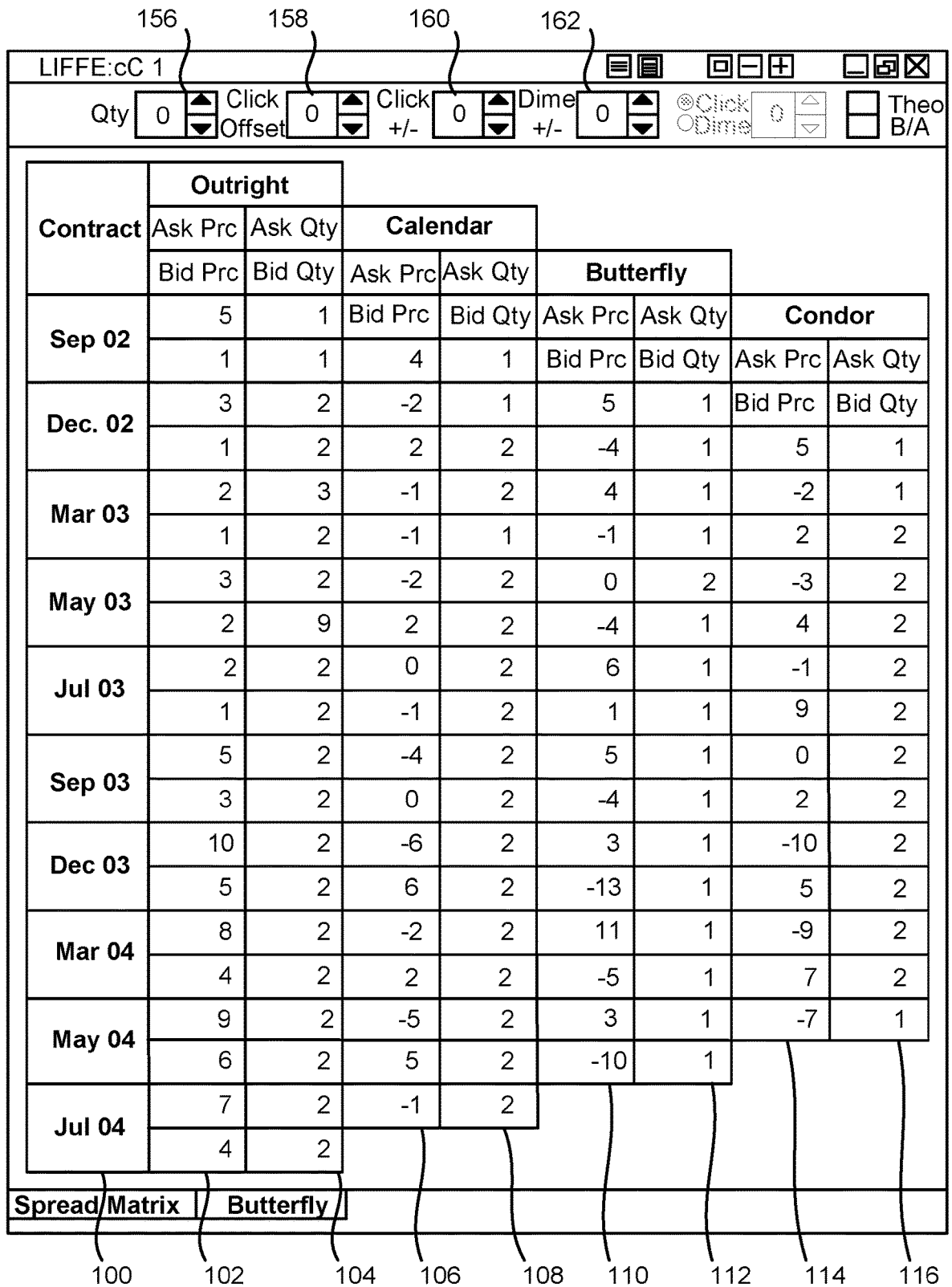
FIG. 2F is a screenshot of an alternate format for displaying spreads in a trading screen that supports click trading.

FIG. 2F is a screenshot of an alternate format for displaying spreads and market-related information in a trading screen that supports click trading. FIG. 2F is an alternate version of the trading screen of FIG. 2, which has been modified to support click trading. However, it should be understood that any of the trading screens described herein may be modified in a similar manner to support click trading.

As shown in FIG. 2F, a trading box, which allows a trader to place a trade simply by clicking on one of the boxes in the display, is located adjacent to the top of the display. However, the trading box may be placed at other locations on the display. The trading box includes a Quantity Box 156, which can be used to select a quantity. The quantity may be adjusted, for example, by using the arrows adjacent to the Quantity Box 156 or by typing a new entry into the quantity Box 156. Of course, other methods may also be used to enter data into a display box, such as the Quantity Box 156 or other various display boxes.

A Click Offset Field 158 can be used to set a maximum number of ticks that the price can move from the last traded price, thereby preventing a user from sending an order that is too far away from the last traded price. A Click+/− Field 160 can be used to set the maximum number of ticks the price can move from the clicked price. This can allow a user to more efficiently trade in a fast moving market. The Click Offset Field 158 and Click+/− Field 160 features are generally mutually exclusive. A user would typically only use one of the two features at a time but may switch between the two features. Click and Dime option buttons can be selected depending on the type of mouse utilized by a user. For a three-button mouse, these options are generally disabled, such as by being grayed out. For a two-button mouse, a user can selected between dime and click and would generally select click. A Dime+/− 162 may be used to set a dime offset when the dime option button is selected. Of course, this description of click trading features is merely exemplary in nature, and other implementations may use additional or fewer features.

Using the fields illustrated in FIG. 2F, a user may place a trade by setting the values in these fields and then clicking on a field in the display, such as a bid price or ask price field. Depending on the market, the order may be matched quickly, or it may remain pending until the market moves such that the order can be filled. While the order is pending, the user may obtain additional information about the order by selecting a dialog box. Using the dialog box, the user may modify the order, such as by changing it price, quantity or other attributes. Alternatively, a user may cancel the order entirely.

As previously described, a user can configure the trading screen. For example, the user can select the tradable object, such as a contract. The tradable object can be associated with one or more time periods, such as months. The user can also select one or more different spreads to be displayed on the trading screen. It is not necessary, however, that a user makes all of these selections.

In an alternate embodiment, default options could be set for the trading screen, such as preprogrammed default options or default options set by the user. The user could then select a tradable object. In response to the selection, the trading screen could display different spreads according to the default options. For example, the trading screen could automatically display the two-leg, butterfly and condor spreads. Once the default options are displayed, the user could then reconfigure the trading screen to display different options, such as removing some or all of the spreads.

Additionally, the user could select from different configurations of the trading screen. For example, the user could select an initial configuration of the trading screen, such as one of the configurations described in FIGS. 2A-2F. Then, the user could switch to another configuration of the trading screen, such as one of the other configurations described in FIGS. 2A-2F. Of course, the user could also select other options, which may also change the configuration of the trading screen. In response to the user's selections, the new configuration of the trading screen may be displayed. The transition to the new trading screen configuration can be seamless, in order to allow the user to continually interact with the trading screen.

In addition to changing the configuration of the trading screen, the data outputted by the trading screen can also be configured to display different types of pricing and quantity information. For example, the trading screen can output direct prices, which can be provided by the exchange. The direct prices correspond to the actual tradable objects traded on the exchange. As previously discussed, the direct prices can be for single tradable objects, such as stocks, options, contacts, futures or other tradable commodities. Additionally, if the exchange supports direct trading of spreads, the direct prices can be for spreads.

In another configuration, the trading screen can be configured to display implied prices, which are described in more detail below. The user can specify one or more spreads, and the implied prices for the spreads can be computed. As previously described, an implied price can be computed based on the various direct prices that comprise the legs of the spread. In addition to computing and displaying implied prices, implied-on-implied prices may also be computed and displayed. While implied prices are computed using a combination of direct prices, implied-on-implied are computed using one or more implied prices. Thus, an implied-on-implied price can be computed using only implied prices, or it may be computed using a combination of implied and direct prices. Of course, the trading screen could display direct prices for some spreads while displaying implied prices, implied-on-implied prices, or a combination implied and implied-on-implied prices for other spreads.

In yet another configuration, the trading screen can be configured to display the more favorable of the implied prices or direct prices. According to this configuration, the implied prices are calculated and compared to any available direct prices. If the implied prices provide more favorable price information, such as the implied bid price is higher than the direct bid price or the implied ask price is lower than the direct ask price, then the implied prices would be displayed. However, if the direct prices are more favorable then they are displayed. If direct prices are not available such as the exchange does not provide price information but it might match orders anyway, then the implied prices are displayed.

III. Displaying Implied Prices

Sometimes, an exchange does not provide all of the market information to the trader, which is often needed to make desirable trades. For example, an exchange might provide prices in the outright legs of the spread, but not the actual spread price (or vice-versa). However, this can mislead the trader because even though the exchange does not always provide all of the market information (e.g., not providing implied information) to the trader, the exchange may still allow the trader to trade the spread and the matching engine at the exchange would complete the spread. To make more desirable trades, however, it is desirable to see a complete picture of all the market information (e.g., direct and/or implied information). To do this, the present embodiments use the market information received from an exchange and automatically compute implied prices and quantities.

Displaying implied prices can advantageously allow a trader to view the implied market for the spread. While a direct market may not exist for the spread, the trader can still view the implied market for the spread. However, the trader could also choose to view the implied market for a spread when a direct market for the spread also exists. Changes in the direct prices of the legs comprising the spread can cause a corresponding change in the implied price of the spread. The implied prices can be displayed by the trading screen and viewed by the user.

Although a trader could view the direct prices of the legs, oftentimes the trader would be unable to continually recompute the implied prices and quantities of the spread based on the direct prices quickly enough to see market trends. The trading software could compute the implied prices and quantities, and it could display that information on the trading screen. Then, the trader would be able view the implied prices and quantities in a much more useful manner, and the trader would be more likely to view market trends for the spread or arbitrage opportunities, for example.

The implied prices could be differentiated from the direct prices, for example, by displaying the implied and direct prices using different colors. For example, the text for the prices could be displayed in different colors, or the backgrounds or borders for the displays could be displayed using different colors. This can allow the trader to quickly and easily determine whether the trader is viewing implied prices or direct prices. The quantity information can be similarly differentiated.

Figure 3:
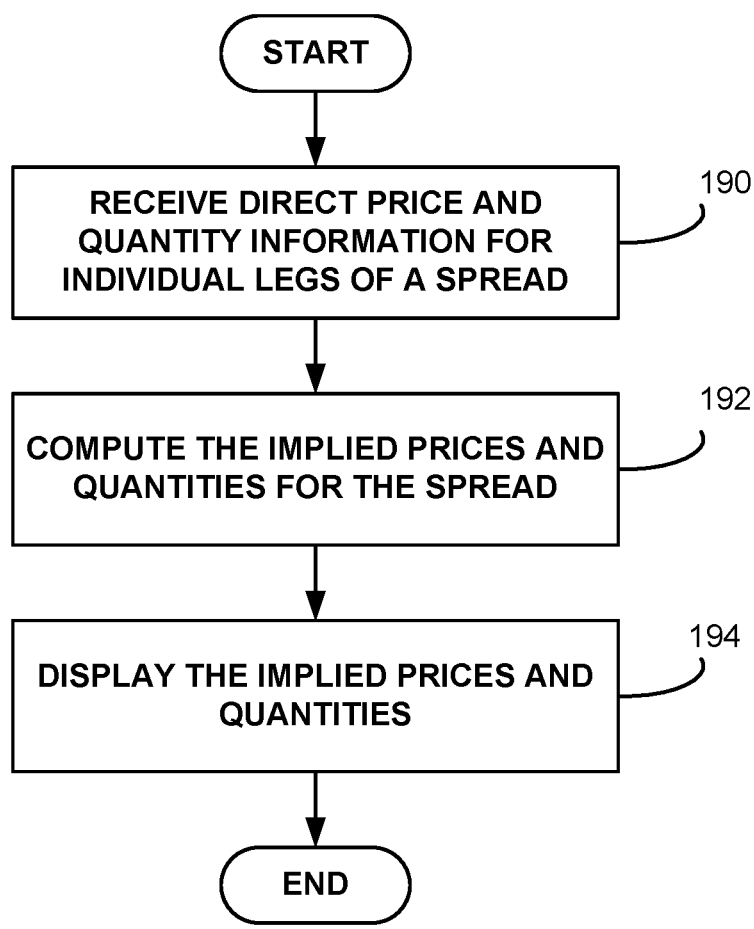
FIG. 3 is a flowchart of a preferred process to calculate and display implied prices and quantities for a spread.

FIG. 3 is a flowchart of a preferred process to calculate and display implied price and quantities for a spread, such as can be performed by trading software. At Step 190, the trading software receives direct price and quantity information for individual legs of a spread. Then, at Step 192, the trading software computes the implied prices and quantities for the spread using the direct price and quantity information for the individual legs. This can be done, for example, using the formulas described below. Then, at Step 194, the trading software displays the implied prices and quantities on a trading screen.

Figure 4:
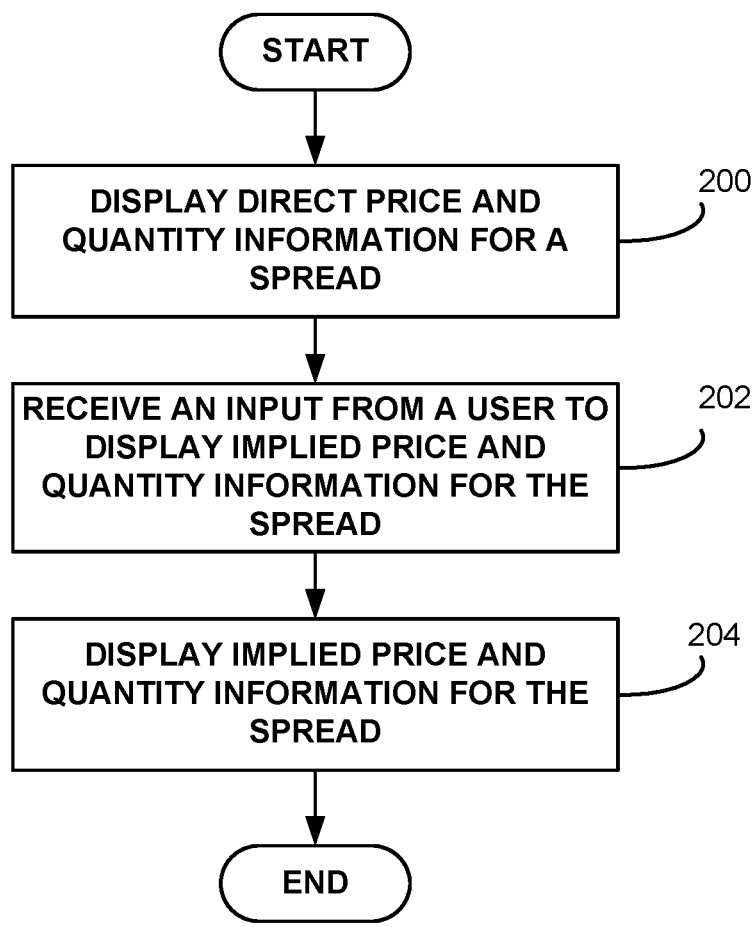
FIG. 4 is a flowchart of a preferred process to switch from displaying direct price and quantity information for a spread to displaying implied price and quantity information for the spread.

The trading software can switch between displaying direct price and quantity information and displaying implied price and quantity information. FIG. 4 is a flowchart of a preferred process to switch from displaying direct price and quantity information for a spread to displaying implied price and quantity information for the spread. At Step 200, the trading software displays direct price and quantity information for the spread, such as by outputting the direct price and quantity information on the trading screen. Then, at Step 202, trading software receives an input from a user to display implied price and quantity information. At Step 204, the trading software displays the implied price and quantity information for the spread.

Figure 5:
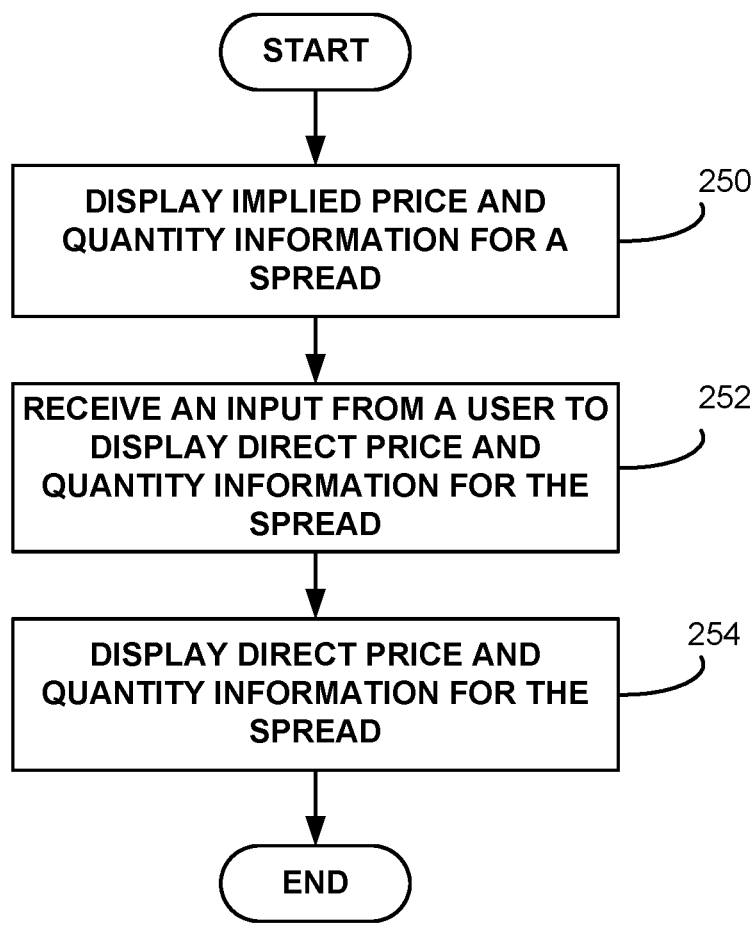
FIG. 5 is a flowchart of a preferred process to switch from displaying implied price and quantity information for a spread to displaying direct price and quantity information for the spread.

FIG. 5 is a flowchart of a preferred process to switch from displaying implied price and quantity information for a spread to displaying direct price and quantity information for the spread. The trading software displays implied price and quantity information for the spread, as shown at Step 250. Then, at Step 252, the trading software receives an input from a user to display direct price and quantity information for the spread. Next, at Step 254, the trading software displays the direct price and quantity information for the spread.

In addition to switching between direct and implied displays based on a user's selection, the trading program can automatically switch between the two different views based on other criteria. For example, the trading program could determine whether the direct or implied market offered a more favorable price for a spread, and then it could either display the better of direct or implied market for the spread. Moreover, both direct and implied information may be displayed simultaneously.

Figure 6:
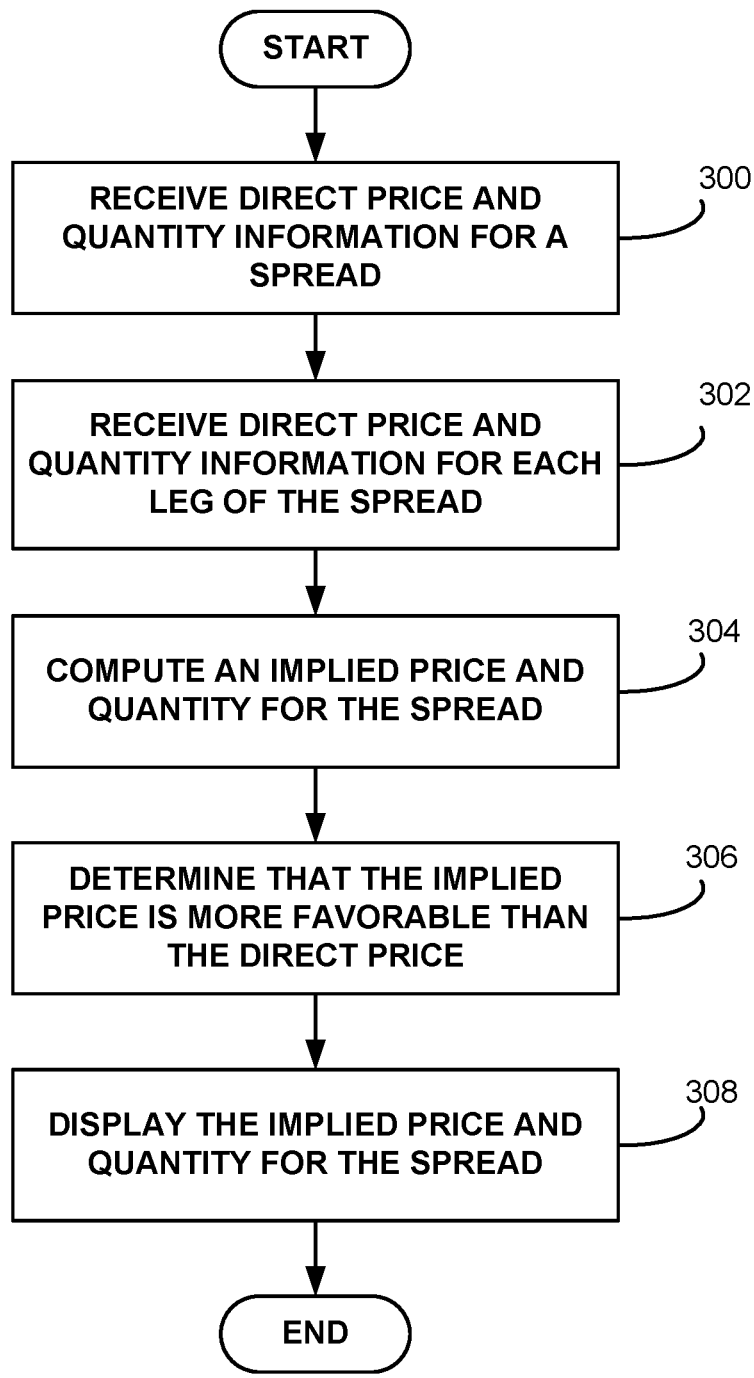
FIG. 6 is a flowchart of a preferred process to responsively switch between displaying the direct and implied markets for a spread based on the prices in each market.

FIG. 6 is a flowchart of a preferred process to responsively switch between displaying the direct and implied markets for a spread based on the prices in each market. At Step 300, the trading software receives direct price and quantity information for a spread. At Step 302, the trading software receives direct price and quantity information for each leg of the spread. As previously described, the trading software may receive a market information feed from a trading exchange. Thus, the trading software may receive only some or all of the direct pricing and quantity information for the spread and for the spreads legs in a continual and contemporaneous manner.

At Step 304, the trading software computes an implied price and quantity for the spread based on the direct prices and quantities for the individual legs. The implied price and quantities that are computed may be used to calculate more accurate price information to be displayed, or they may be used to fill in missing price information that the exchange did not provide. Next, at Step 306, the trading software determines that the implied price is more favorable than the direct price. For example, the trader may be interested in buying the spread, and, therefore, a low price would be favorable. However, if the trader wants to sell the spread, then a high price would be favorable. Of course, other factors could also be used to determine whether the direct or implied price is more favorable. At Step 308, the trading software displays the more favorable implied price and quantity for the spread.

In one embodiment, the computation of the implied price and quantity information can be continually computed, based on updated direct prices and quantities for the individual legs. The trading software can also receive updated direct prices and quantities for the spread, which can allow the trading software to continually reevaluate whether the direct or implied price is more favorable. When the trading software determines that the implied price is no longer more favorable than the direct price, the trading software can switch from displaying the implied price information to displaying the direct price information.

The trading screen can also support additional functionality. In one example of additional functionality, a user could place trades directly off the trading screen. For example, the user could select one of the boxes corresponding to one of the bid or ask prices, such as by using an input device to select one of the boxes. For example, by selecting an ask price, the user could place a buy order at the ask price. Similarly, by selecting a bid price, the user could place a sell order at the bid price. The user could trade the different spreads or outright objects by simply selecting the corresponding bid or ask boxes.

Once the user makes the selection, such as by clicking on one of the boxes with a mouse, an order could be automatically placed for the corresponding tradable object. The trading screen can be configured to trade a predetermined quantity of the user's selection, thereby allowing quick entering of orders. The user could manually adjust the predetermined quantity. Alternatively, the user could be prompted for a quantity after making the selection.

In another example of additional functionality, the user can configure the trading screen to display spreads specified by the user. The trading screen can display direct prices for the spreads, if they are traded on the exchange, and the trading screen can also display the implied prices. The trading screen can switch between the direct and implied prices, such as by displaying the most advantageous prices. Then, the user can place trades by simply clicking on the desired tradable object.

Additionally, the user could dynamically reconfigure the trading screen's display, such as by selecting a new tradable object. The new tradable object could be in addition to the currently displayed tradable objects, or it could replace one of the currently displayed tradable objects. This could be done, for example, by "dragging and dropping" a new tradable object into the trading screen. Dragging and dropping provides a method for a user of a computer display to reconfigure the layout of the display, such as by using a mouse or other input device to select and move an object displayed on the computer screen.

Once the user adds a new tradable object to the trading screen, the outright and spread information can be recomputed using the new tradable object. For example, the user may replace a currently displayed March corn contract with a February corn contact. The trading screen would then display the February corn contact in the Contract column 100 instead of displaying the March corn contract. The outright information for the February corn contract would be displayed in the Outright price column 102 and the Outright quantity column 104, and this information would replace the information for the March corn contract.

The spreads are also recalculated using the February corn contact in place of the March corn contact. Thus, any spread leg that used the March corn contract would be replaced by the February corn contact. The bid and ask prices as well as the bid and ask quantities for the spreads would also be updated to reflect the change. Thus, by changing a single entry in the Contract column 100, the trading screen would automatically recompute and display updated values corresponding to the changed tradable object. This can advantageously allow a trader to expeditiously reconfigure the trading screen and to quickly view the updated information. Once updated, the user could places trades for the added tradable object or for the readjusted spreads.

IV. Computing Direct and Implied Prices

Exchanges can support trading spreads as an atomic unit such that a spread will only be completed if all the orders in the legs, which correspond to the spread, are filled. This can greatly reduce the risk, for example, of filling one leg but not filling the other leg. An exchange can create a spread and support a market for that spread, thereby allowing traders to trade that spread as an atomic unit. For example, an exchange could define a spread as a buy February S&P 500 option and a sell March S&P 500 option. Traders would then be able to see market prices for the spread as an atomic unit and would also be able to buy and sell the spread as an atomic unit.

Thus, a trader could place an order for the spread. The order would be sent to the exchange, and the exchange would handle completing each leg of the spread. If the legs could be traded at the order price, then the spread order could be completed. If, however, all the legs of the spread could not be traded, then the exchange would not complete the spread. As mentioned above, by trading the spread as an atomic unit, traders are able to avoid legging risk, such as failing to get a fill on all necessary legs such that the complete spread position is properly hedged. Also, trading spreads in this manner can guarantee that, if the spread order executes, it will executed at the order price.

In addition to supporting spreads specified by the exchange, some exchanges, such as the London International Financial Futures and Options Exchange ("LIFFE"), support dynamically created spreads. On these exchanges, a trader is not limited to trading only spreads configured by the exchange. Rather, the trader can dynamically create a spread. Once created, traders on the exchange can trade the dynamically created spread.

The exchange can additionally support atomic trading of the dynamically created spread. Therefore, the traders can buy and sell the spread as an atomic unit, instead of having to separately execute each leg of the spread. After placing the order, the exchange handles filling the legs of the orders. If all the legs can be completed, then the spread order is completed at the specified order price. The prices for spreads traded as an atomic unit are generally termed direct prices.

In addition to trading spreads as an atomic unit, spreads can be traded individually in the outright markets, for example, by separately trading each leg of the spread. Trading spreads individually can allow traders to buy and sell spreads that are not supported by an exchange. For example, an exchange may not support spreads at all, or the exchange may not support a particular spread. By trading the legs individually, where the exchange does not support the spread, the trader can nevertheless trade the spread.

Trading spread legs separately, however, can create a delay in completing a purchase or sale of the spread. Since the trades of the individual legs are generally not executed simultaneously, some legs may trade faster than others. Thus, a trader may experience a delay in completing all the legs of the spread. The delay can also affect the purchase or sale price of the spread, because the prices of the individual legs may change before the purchase or sale of the spread can be completed.

Also, trading spreads in this manner does not guarantee the completion of each leg of the spread. For example, a trader could begin trading a spread by executing the first leg of the spread. Once the trader attempts to trade the second leg of the spread, however, the trader may not be able to successfully complete that leg. For instance, the market may have moved away from the trader's price before that leg executed. The trader would then be forced to trade that leg at a different, and possible less advantageous price, or would be left with an incomplete spread.

When trading the individual legs of the spread separately, the price of the spread may be computed based on the prices of the individual legs. This price is typically termed an implied price. The implied price is generally in contrast to the direct price, which is used when the spread is traded as an atomic unit.

The implied prices can be can be computed based on the prices of the individual legs. As with other tradable objects, both a bid price and an ask price can be computed for the spread. The bid price is typically the price at which a buyer is offering to purchase the spread, and the ask price is typically the price at which a seller is offering to sell the spread. Thus, the bid and ask prices for a spread are computed by combining the bid and ask prices for the individual legs.

For example, a butterfly spread comprises purchasing both front and far months and selling a middle month. The ask price for the butterfly spread can then be computed using the ask price for the front and far months and the bid price for the middle month. Once computed, the ask price would reflect the price at which a seller would sell the spread. Conversely, the bid price for the spread would use the bid prices for the front and far months and the ask price for the middle month. The bid price would reflect the price at which a buyer could purchase the spread.

In addition to computing the implied bid and ask prices, the implied quantities can also be computed. The implied quantities represent the number of implied spreads available at the bid and ask prices. These quantities, of course, depend on the available quantities of the individual legs. The following formulas may be used to compute the implied bid and ask prices and the implied quantities of a butterfly spread.

Butterfly Price and Quantity Formulas $$impliedAskPrice=leg1AskPrice-2*leg2BidPrice+leg3AskPrice$$

$$impliedAskQty=min(min(leg1AskQty,leg2BidQty/2),leg3AskQty)$$

$$impliedBidPrice=leg1BidPrice-2*leg2AskPrice+leg3BidPrice$$

$$impliedBidQty=min(min(leg1BidQty,leg2AskQty/2),leg3BidQty)$$

A condor spread comprises purchasing a front and far month and selling two different middle months. The bid and ask prices of a condor spread, therefore, are based on the bid and ask prices of the individual legs. Similarly, the implied bid and ask quantities are based on the available quantities of the individual legs. The formulas listed below may be used to compute the implied bid and ask prices and the available quantities of a condor.

Condor Price and Quantity Formulas $$impliedAskPrice=leg1AskPrice-leg2BidPrice-leg3BidPrice+leg4AskPrice$$

$$impliedAskQty=min(min(min(leg1AskQty,leg2BidQty),leg3BidQty),leg4AskQty)$$

$$impliedBidPrice=leg1BidPrice-leg2AskPrice-leg3AskPrice+leg4BidPrice$$

$$impliedBidQty=min(min(min(leg1BidQty,leg2AskQty),leg3AskQty),leg4BidQty)$$

Of course, the preceding formulas can be modified for use with two-leg spreads or for use with spreads having more than four legs.

Some exchanges that support spread trading, such as LIFFE, do not necessarily calculate some or all implied prices of spreads that can be displayed to traders. While traders can view direct prices for the spreads, traders would additionally benefit from having implied prices calculated automatically through their software. They would further benefit by having an interface that allowed easy comparisons to be made between direct and implied prices for any combination of months that make up their butterfly or condor spread.

For example, a trader could dynamically create a spread on an exchange such as LIFFE. After creating the spread, it would be available on the exchange and could be traded in atomic units. However, a newly created spread is unlikely to have a heavy trading volume. Traders may take time before they learn about the spread and begin to trade the spread. Therefore, the initial trading volume might be small. Additionally, the spread may be an uncommon spread or one otherwise unlikely to acquire a large market and thus a large trading volume.

While the direct market for these spreads may be sparse, the implied market may have a much higher volume. For example, the legs of a spread may have a higher volume, and they could be readily traded individually. By trading the spread based on implied prices, such as by individually trading the legs, a trader can find a more liquid market for the spread. Therefore, it might be advantageous to view the implied market information for the spread in addition to the direct market information. And, when trading these markets, the trader would benefit by having software that would allow for automatic calculation and display of complex strategies, such as butterflies and condors, for any number of time period or strike price combinations.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams. The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

I claim:

1. A method including:
    generating by a computing device a first area associated with a first tradable object, wherein the first area includes a first highest bid price, a first lowest ask price, a first highest bid quantity, and a first lowest ask quantity;
    generating by the computing device a second area associated with a second tradable object, wherein the second area includes a second highest bid price, a second lowest ask price, a second highest bid quantity, and a second lowest ask quantity;
    generating by the computing device a first spread area associated with a first type of spread between the first tradable object and the second tradable object, wherein the first spread area includes a first spread highest bid price, a first spread lowest ask price, a first spread highest bid quantity, and a first spread lowest ask quantity;
    displaying by the computing device the first area, the second area, and the first spread area, wherein the second area is displayed substantially adjacent to the first area along a first axis, wherein the first spread area is displayed along a second axis, wherein the second axis is parallel and substantially adjacent to the first axis, wherein the first spread area is substantially centered with respect to the first area and the second area to correlate the first type of spread to the first tradable object and the second tradable object;
    providing by the computing device a first order entry region configured to receive a command to initiate a trade order for the first tradable object, wherein the first area includes the first order entry region, wherein the trade order for the first tradable object includes a price based on one of the first highest bid price and the first lowest ask price;
    providing by the computing device a second order entry region configured to receive a command to initiate a trade order for the second tradable object, wherein the second area includes the second order entry region, wherein the trade order for the second tradable object includes a price based on one of the second highest bid price and the second lowest ask price; and
    providing by the computing device a first spread order entry region configured to receive a command to initiate a trade order for the first type of spread, wherein the first spread area includes the first spread order entry region, wherein the trade order for the first type of spread includes a price based on one of the first spread highest bid price and the first spread lowest ask price.

2. The method of claim 1, wherein the first axis is one of vertical and horizontal.

3. The method of claim 1, wherein the first area includes a first identifier for the first tradable object, wherein the second area includes a second identifier for the second tradable object, wherein the first spread area includes a first spread identifier for the first type of spread.

4. The method of claim 1, wherein the first type of spread is a calendar spread.

5. The method of claim 1, further including:
    receiving by the computing device the first spread highest bid price and the first spread lowest ask price from one of a gateway and an electronic exchange.

6. The method of claim 1, further including:
    calculating by the computing device the first spread highest bid price and the first spread lowest ask price based on the first highest bid price, the first lowest ask price, the second highest bid price, and the second lowest ask price.

7. The method of claim 1, wherein at least one of the first spread highest bid price and the first spread lowest ask price includes an implied price.

8. The method of claim 1, further including:
    generating by the computing device a third area associated with a third tradable object, wherein the third area includes a third highest bid price, a third lowest ask price, a third highest bid quantity, and a third lowest ask quantity;
    generating by the computing device a second spread area associated with a second type of spread between the first tradable object, the second tradable object, and the third tradable object, wherein the second spread area includes a second spread highest bid price, a second spread lowest ask price, a second spread highest bid quantity, and a second spread lowest ask quantity;
    displaying by the computing device the third area, wherein the third area is displayed substantially adjacent to the second area along the first axis;
    displaying by the computing device the second spread area, wherein the second spread area is displayed along a third axis, wherein the third axis is parallel and substantially adjacent to the second axis, wherein the second spread area is substantially centered with respect to the first area, the second area, and the third area to correlate the second type of spread to the first tradable object, the second tradable object, and the third tradable object;
    providing by the computing device a third order entry region configured to receive a command to initiate a trade order for the third tradable object, wherein the third area includes the third order entry region, wherein the trade order for the third tradable object includes a price based on one of the third highest bid price and the third lowest ask price; and
    providing by the computing device a second spread order entry region configured to receive a command to initiate a trade order for the second type of spread, wherein the second spread area includes the second spread order entry region, wherein the trade order for the second type of spread includes a price based on one of the second spread highest bid price and the second spread lowest ask price.

9. The method of claim 8, wherein the third area includes a third identifier for the third tradable object, wherein the second spread area includes a second spread identifier for the second type of spread.

10. The method of claim 8, wherein the second type of spread is a butterfly spread.

11. The method of claim 8, further including:
    receiving by the computing device the second spread highest bid price and the second spread lowest ask price from one of a gateway and an electronic exchange.

12. The method of claim 8, further including:
calculating by the computing device the second spread highest bid price and the second spread lowest ask price based on the first highest bid price, the first lowest ask price, the second highest bid price, the second lowest ask price, the third highest bid price, and the third lowest ask price.

13. The method of claim 8, wherein at least one of the second spread highest bid price and the second spread lowest ask price includes an implied price.

14. The method of claim 8, further including:
generating by the computing device a fourth area associated with a fourth tradable object, wherein the fourth area includes a fourth highest bid price, a fourth lowest ask price, a fourth highest bid quantity, and a fourth lowest ask quantity;
generating by the computing device a third spread area associated with a third type of spread between the first tradable object, the second tradable object, the third tradable object, and the fourth tradable object, wherein the third spread area includes a third spread highest bid price, a third spread lowest ask price, a third spread highest bid quantity, and a third spread lowest ask quantity;
displaying by the computing device the fourth area, wherein the fourth area is displayed substantially adjacent to the third area along the first axis;
displaying by the computing device the third spread area, wherein the third spread area is displayed along a fourth axis, wherein the fourth axis is parallel and substantially adjacent to the third axis, wherein the third spread area is substantially centered with respect to the first area, the second area, the third area, and the fourth area to correlate the third type of spread to the first tradable object, the second tradable object, the third tradable object, and the fourth tradable object;
providing by the computing device a fourth order entry region configured to receive a command to initiate a trade order for the fourth tradable object, wherein the fourth area includes the fourth order entry region, wherein the trade order for the fourth tradable object includes a price based on one of the fourth highest bid price and the fourth lowest ask price; and
providing by the computing device a third spread order entry region configured to receive a command to initiate a trade order for the third type of spread, wherein the third spread area includes the third spread order entry region, wherein the trade order for the third type of spread includes a price based on one of the third spread highest bid price and the third spread lowest ask price.

15. The method of claim 14, wherein the fourth area includes a fourth identifier for the fourth tradable object, wherein the third spread area includes a third spread identifier for the third type of spread.

16. The method of claim 14, wherein the third type of spread is a condor spread.

17. The method of claim 14, further including:
receiving by the computing device the third spread highest bid price and the third spread lowest ask price from one of a gateway and an electronic exchange.

18. The method of claim 14, further including:
calculating by the computing device the third spread highest bid price and the third spread lowest ask price based on the first highest bid price, the first lowest ask price, the second highest bid price, the second lowest ask price, the third highest bid price, the third lowest ask price, the fourth highest bid price, and the fourth lowest ask price.

19. The method of claim 14, wherein at least one of the third spread highest bid price and the third spread lowest ask price includes an implied price.

* * * * *